US012625229B2

(12) United States Patent
Leppänen et al.

(10) Patent No.: US 12,625,229 B2
(45) Date of Patent: May 12, 2026

(54) METHOD AND ARRANGEMENT FOR EVALUATING A DISTANCE BETWEEN AT LEAST TWO ANTENNA UNITS

(71) Applicant: KOHERENT OY, Vantaa (FI)

(72) Inventors: Kari Leppänen, Helsinki (FI); Jussi Salmi, Haarajoki (FI)

(73) Assignee: KOHERENT OY, Vantaa (FI)

( * ) Notice: Subject to any disclaimer, the term of this patent is extended or adjusted under 35 U.S.C. 154(b) by 283 days.

(21) Appl. No.: 18/564,233

(22) PCT Filed: May 25, 2022

(86) PCT No.: PCT/FI2022/050363
§ 371 (c)(1),
(2) Date: Nov. 27, 2023

(87) PCT Pub. No.: WO2022/258883
PCT Pub. Date: Dec. 15, 2022

(65) Prior Publication Data
US 2024/0248168 A1     Jul. 25, 2024

(30) Foreign Application Priority Data

Jun. 11, 2021     (FI) ..................................... 20215682

(51) Int. Cl.
*G01S 7/02* (2006.01)
*G01S 13/84* (2006.01)
(52) U.S. Cl.
CPC .............. *G01S 7/026* (2013.01); *G01S 13/84* (2013.01)

(58) Field of Classification Search
CPC ........ G01S 7/026; G01S 13/84; G01S 7/4021; G01S 13/825
See application file for complete search history.

(56) References Cited

U.S. PATENT DOCUMENTS 6,771,218 B1* 8/2004 Lalezari ................... H01Q 1/28
342/373
7,948,444 B2* 5/2011 Signell ................... H01Q 19/28
343/893
(Continued)

FOREIGN PATENT DOCUMENTS

DE        202008018084 U1     10/2011
GB             1145475 A       3/1969
(Continued)

OTHER PUBLICATIONS

European Patent Office, International Search Report and Written Opinion, Application No. PCT/FI2022/050363, mailed Aug. 19, 2022, 14 pages.
(Continued)

*Primary Examiner* — Kabir A Timory
(74) *Attorney, Agent, or Firm* — Ziegler IP Law Group, LLC.

(57) ABSTRACT
A method for evaluating a distance between at least a first antenna unit and a second antenna unit by two-way transmission of at least two signals having different circular polarizations between the antenna units. Phase information is determined and used to determine at least a first phase sum and a second phase sum, where the phase sums are further utilized in determination of at least one distance indicator that is indicative of the distance between the first antenna unit and the second antenna unit.

13 Claims, 8 Drawing Sheets

(56)     References Cited

U.S. PATENT DOCUMENTS

| | | |
|---|---|---|
| 2011/0122024 A1 | 5/2011 | Eidloth et al. |
| 2015/0346349 A1* | 12/2015 | Taylor, Jr. ............. G01S 5/0264 |
| | | 342/357.26 |
| 2015/0351067 A1 | 12/2015 | Taylor et al. |
| 2017/0180011 A1 | 6/2017 | Charvat et al. |
| 2017/0227623 A1 | 8/2017 | Park et al. |

FOREIGN PATENT DOCUMENTS

| | | |
|---|---|---|
| WO | 2016205217 A1 | 12/2016 |
| WO | 2020205369 A1 | 10/2020 |
| WO | 2021064295 A1 | 4/2021 |

OTHER PUBLICATIONS

Finnish Patent and Registration Office, Search Report, Application No. 20215682, dated Feb. 9, 2022, 2 pages.
Intellectual Property India, Examination report under sections 12 & 13 of the Patents Act, 1970 and the 1 Patents Rules, 2003, Application No. 202317073219, mailed Nov. 6, 2025, 8 pages.

* cited by examiner

3A

3B

Figure 7:
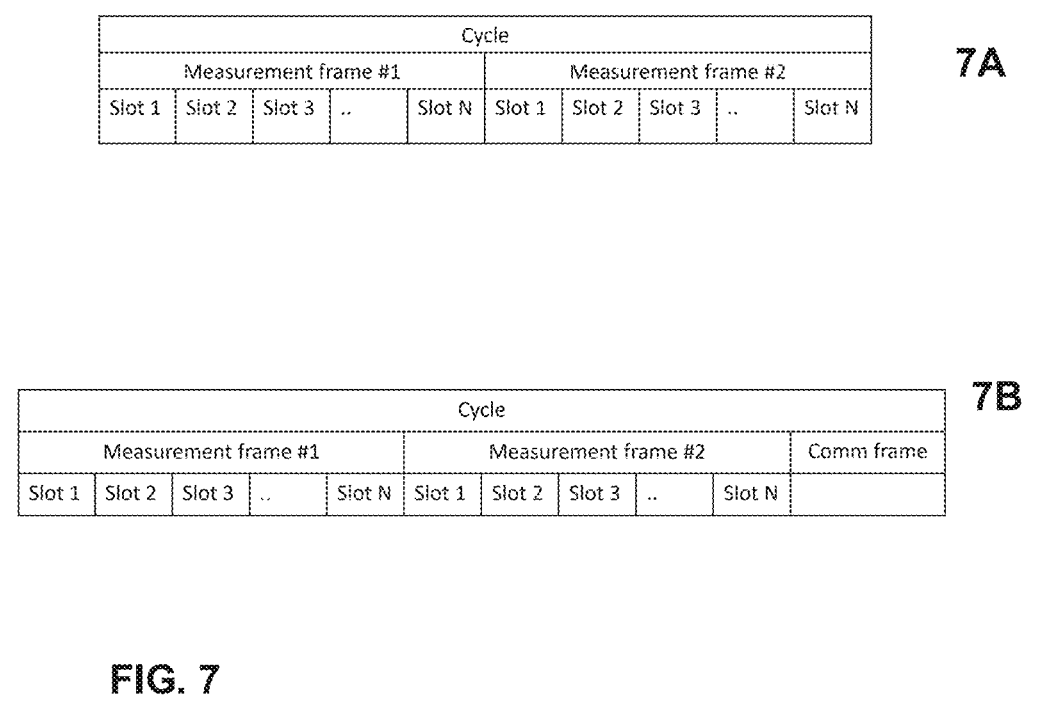

| Cycle | | | | | | | | | |
|---|---|---|---|---|---|---|---|---|---|
| Measurement frame #1 | | | | | Measurement frame #2 | | | | |
| Slot 1 | Slot 2 | Slot 3 | .. | Slot N | Slot 1 | Slot 2 | Slot 3 | .. | Slot N |

7A

| Cycle | | | | | | | | | | |
|---|---|---|---|---|---|---|---|---|---|---|
| Measurement frame #1 | | | | | Measurement frame #2 | | | | | Comm frame |
| Slot 1 | Slot 2 | Slot 3 | .. | Slot N | Slot 1 | Slot 2 | Slot 3 | .. | Slot N | |

METHOD AND ARRANGEMENT FOR EVALUATING A DISTANCE BETWEEN AT LEAST TWO ANTENNA UNITS

TECHNICAL FIELD OF THE INVENTION

The invention relates to radio communication and localization in general. More specifically, the invention relates to evaluating a distance between at least a first antenna unit and a second antenna unit by two-way transmission of at least two signals having different circular polarizations between the antenna units.

BACKGROUND OF THE INVENTION

Systems and methods involving transmission of signals, such as radio signals, from a first (transmitter) device to a second (receiver) device are used in many applications, e.g. in tracking or other purposes where distance measurements are utilized. In some systems, it may be possible to evaluate the distance between two devices by alternately using the first and second devices as transmitter and receiver. Here, the phases of one or more transmitted signals that are received by the receiving device may be determined and used in distance measurements. There are, however, many complications involved with such measurements, and obtaining accurate results regarding the distance between the devices may be laborious or unfeasible.

One problem is associated with reflections of the signals. Reflections of the transmitted signal from other objects that reach the receiver device may be impossible to distinguish from the signal received directly from the transmitter device. When determining a distance or phase length (from the determined phase of the received signal with respect to a local oscillator of the receiver device), the determined distance or phase length will then be affected by the reflected signal and may be erroneous. Distinguishing the original transmitted signal from a reflected signal is especially difficult in cases where the reflection occurs in a direction close to the direction of the original signal. In such a case the reflected signal has approximately the same delay as the original signal which makes the reflected signal practically indistinguishable from the original one in spatial or temporal signal processing. Still, in applications where extremely high distance measurement accuracy is desired, such distortion of the signal phase is detrimental.

To reduce or eliminate the effect of reflections, polarized signals may be employed in the transmissions. Circularly polarized signals are known as especially advantageous in being able to reduce the effect of reflected signals from metal surfaces, which may be the most problematic reflection surfaces if linearly polarized signals are used. Reflections from metal surfaces (or other surfaces with similar reflection coefficients) will essentially change the polarization of the signal, such that if the receiving antenna is adapted to receive essentially only signals with circular polarization of the original signal, the reflected signal may not be received or at least will be strongly attenuated. Circularly polarized signals may also reduce the effect of reflections due to other types of surfaces, even if the polarization of the reflected signal is not perfectly circular.

There are, however, also some problems associated with the use of circularly polarized signals. Rotation along the line-of-sight (LOS) axis between the antenna units will affect phase measurements and thus the determination of distance between the antenna units. In e.g. geodetic GNSS, the problem of rotation along the LOS axis between transmitter and receiver may be eliminated by using a joint solution of the rotation angle and the position coordinates as well as differentiation with respect to a reference station in proximity. This requires a large number of satellites in the solution, making such a solution impractical for a terrestrial system where only a small number of antenna units are available for tracking the position of a moving radio device. Also, a reference antenna may be impractical for terrestrial navigation.

SUMMARY OF THE INVENTION

An object of the invention is to alleviate at least some of the problems in the prior art. In accordance with one aspect of the present invention, a method is provided for evaluating a distance between at least a first antenna unit and a second antenna unit, the method comprising at least transmitting a first signal via the first antenna unit, said first signal comprising a first circular polarization, receiving the first signal at the second antenna unit, determining first phase information, said first phase information being indicative of a phase of the received first signal with respect to a local oscillator of a radio unit with which the second antenna unit is associated, transmitting a first response signal via the second antenna unit, said first response signal essentially corresponding to said first signal, receiving the first response signal at the first antenna unit, determining first response phase information, said first response phase information being indicative of a phase of the received first response signal with respect to a local oscillator of a radio unit with which the first antenna unit is associated, determining a first phase sum being indicative of a sum of the first phase information and the first response phase information, transmitting a second signal via one of the first or second antenna units, said second signal comprising a second circular polarization, the second circular polarization being opposite to the first circular polarization, receiving the second signal at the other of the first or second antenna unit, determining second phase information, said second phase information being indicative of a phase of the received second signal with respect to a local oscillator of the radio unit with which the receiving antenna unit is associated, transmitting a second response signal via the other of the first or second antenna units which has not transmitted the second signal, said second response signal essentially corresponding to said second signal, receiving the second response signal at the antenna unit that has transmitted the second signal, determining second response phase information, said second response phase information being indicative of a phase of the received second response signal with respect to the local oscillator of a radio unit with which the receiving antenna unit is associated, determining a second phase sum being indicative of a sum of the second phase information and the second response phase information, and determining at least one distance indicator that is indicative of the distance between the first antenna unit and the second antenna unit based on at least the first phase sum and second phase sum.

In another aspect, the invention also relates to an arrangement as defined in independent claim 13.

The present invention allows at least one distance indicator, indicative of a distance between the antenna units and based on determined phase information, to be determined with high accuracy. The accuracy of the determined distance indicator may be high enough so that the distance between a first antenna unit and a second antenna unit may be evaluated or determined with sub-millimeter accuracy, where the absolute distance measurement accuracy depends on the accuracy of phase measurement at the carrier frequency converted to wavelength in meters. The present invention relates to the determination of phase information and its subsequent manipulation through one or more distance indicators, which allows the determination of high-accuracy absolute distances. The determination of the absolute distance is not, however, required in the claimed invention and the various methods which may be used to obtain such absolute distance measurements are not discussed in detail in the present text.

The invention enables the high accuracy measurements using cost-effective antenna units. The solution may allow using circularly polarized antenna units and signals to mitigate the effect of reflections in phase measurements, while compensating for rotation between antenna units and possibly changes of the antenna phase center as a function of signal direction. Without these corrections or compensations enabled through the invention, the accuracy of a subsequently determined distance would be at centimeter-level at best when cm-waves radios are used for distance measurement.

The invention may be useful in any application where one or more distances are to be evaluated or monitored. An arrangement according to the present invention could, for instance, be utilized in systems for tracking objects or other location tracking, indoor positioning systems, etc. Tracking of an object may, for instance, be carried out by tracking a change in distance between a first antenna unit associated with a reference location and a second antenna unit associated with or coupled to the object.

The antenna units that may be utilized can be of lower quality than for instance those that are utilized in geodetic GNSS measurements, where the antenna units are selected to eliminate the phase center variation problems. Such high-quality antenna units are expensive, yet the present invention allows to use simpler and cheaper circularly polarized antenna units. The arrangement according to the invention may thus be inexpensive to implement and use.

With the present invention, the effect of the rotation between the first antenna unit and the second antenna unit along the LOS axis may thus be compensated for or eliminated in the determination of at least one distance indicator and therefore an optionally subsequently determined distance between the antenna units (or at least their reference points), leading to a more accurate evaluation of the distance than without the compensation. When referring to distance between the first and second antenna unit, it may be understood that the distance may be determined or evaluated through a distance indicator that may be used to determine a phase length that is indicative of the distance between the antenna units. The evaluation of a distance does not necessarily mean that the absolute distance is determined, but as the skilled person will understand, the distance may be evaluated through knowledge of a phase length that gives a known fractional part of a wavelength of the full distance between the antenna units. The determination of the absolute, full distance between the antenna units may then involve further calculation of e.g. integer ambiguity, which is not discussed herein.

Also, it may be possible to evaluate the distance between the antenna units by using only the first and second antenna unit, i.e. only the antenna units between which the link or baseline distance is to be evaluated may be sufficient to evaluate the distance (or at least distance indicator) with satisfactory accuracy. Separate reference antenna units or consideration of a joint solution (where a plurality of satellites or antenna units are observed and solutions fitting the data obtained therefrom are determined) may not be required. In some embodiments, calibration data is obtained regarding the standard antenna pattern of the antenna units, but this data may be previously determined data and may require only data regarding antenna units that are similar in construction to the first and/or second antenna units.

The at least one distance indicator may comprise a first distance variable indicative of a sum of the first phase sum and second phase sum. Using the first distance variable, it may be possible to eliminate the rotation between the first antenna unit and the second antenna unit along the LOS axis in the determination of a distance indicator. A distance indicator and possible distance may then be determined completely independently of said rotation.

Direction of signal data with respect to the coordinate system of each of the first and second antenna unit may be obtained, and said direction of signal data may be utilized in the determination of the at least one distance indicator, optionally by obtaining antenna phase pattern calibration data and interpolating an antenna phase response.

The transmitted signals may be received at at least three separate antenna elements comprised in the first antenna unit and/or second antenna unit to determine direction of signal data.

Embodiments of the method may comprise determining self-measurement data indicative of a phase of a self-measurement signal, for the first and second polarizations, received at a transmitting antenna unit during transmission of a signal and said self-measurement data may be used in determining the at least one distance indicator.

The at least one distance indicator may comprise a rotation variable indicative of a difference between the first phase sum and the second phase sum, while the method may optionally additionally comprise determining a rotation angle between the first antenna unit and the second antenna unit based on the rotation variable. Therefore, it may also be possible to explicitly determine the rotation angle. The rotation variable may be determined at least once and may then be utilized in tracking of the rotation angle between the first antenna unit and the second antenna unit. Subsequent first signals and first response signals may be transmitted to determine subsequent first phase sums to track the distance between the first antenna unit and second antenna unit. It may thus be possible to track a distance indicator at a higher rate with a single polarization measurement, without transmission of signals comprising second polarization, with transmissions of signals with also second polarization occurring at a lower rate.

Each of the at least first and second antenna units may transmit at least one signal within a predetermined time slot and preferably in predetermined order. In some embodiments, the first antenna unit may be a master unit and the remaining at least second antenna unit may be a slave unit. The master unit may be configured to transmit the first signal, wherein the master unit may be configured to check before transmission of the first signal at each measurement cycle whether a radio channel is free for transmission and if the channel is free, the at least first signal is transmitted, said transmitting not being executed if the channel is not free.

In embodiments with master and slave antenna units, the slave unit(s) may be configured to determine, before transmitting of a signal in a given measurement cycle, if a previous antenna unit in the predetermined order of antenna units has transmitted a signal in the measurement cycle, and if yes, transmit their respective signal, while the signal is not transmitted if it is determined that the previous antenna unit has not transmitted a signal.

In some embodiments of the invention, the first signal may be received also at at least a third antenna unit. The third antenna unit may also be configured to transmit a first response signal, which may be received at at least the first and/or second antenna unit, optionally all other non-transmitting antenna units. The second signal may also be received at at least the third antenna unit, which may be configured to transmit a second response signal, which may be received at at least the first and/or second antenna unit. Thus, at least two pairs of antenna units that have performed two-way transmission of at least a signal comprising the first polarization and a signal comprising the second polarization may be obtained. Respective phase information and first and second phase sums may be determined for each pair of antenna units. At least one distance indicator being indicative of the distance between the antenna units for each pair of antenna units may therefore be determined, and at least two distances between antenna units may be evaluated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

The previously presented considerations concerning the various embodiments of the method may be flexibly applied to the embodiments of the arrangement mutatis mutandis, and vice versa, as being appreciated by a skilled person.

BRIEF DESCRIPTION OF THE DRAWINGS

Next the invention will be described in greater detail with reference to exemplary embodiments in accordance with the accompanying drawings, in which:

FIG. 7 depicts allocation of time slots in measurement cycles, FIG. 8 gives a flow chart of a method according to one embodiment of the invention.

DETAILED DESCRIPTION

Figure 1:
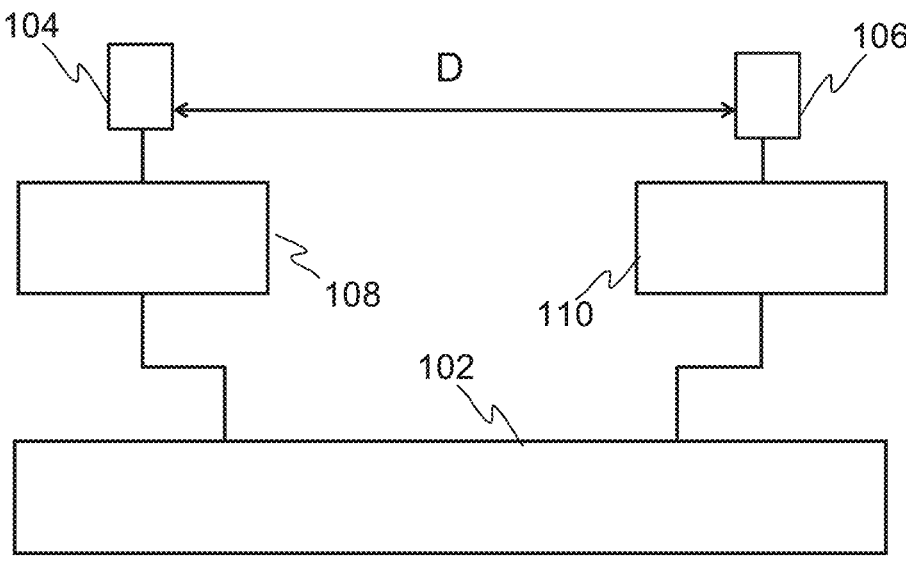
FIG. 1 illustrates schematically an exemplary arrangement according to an embodiment of the invention.
Figure 3:
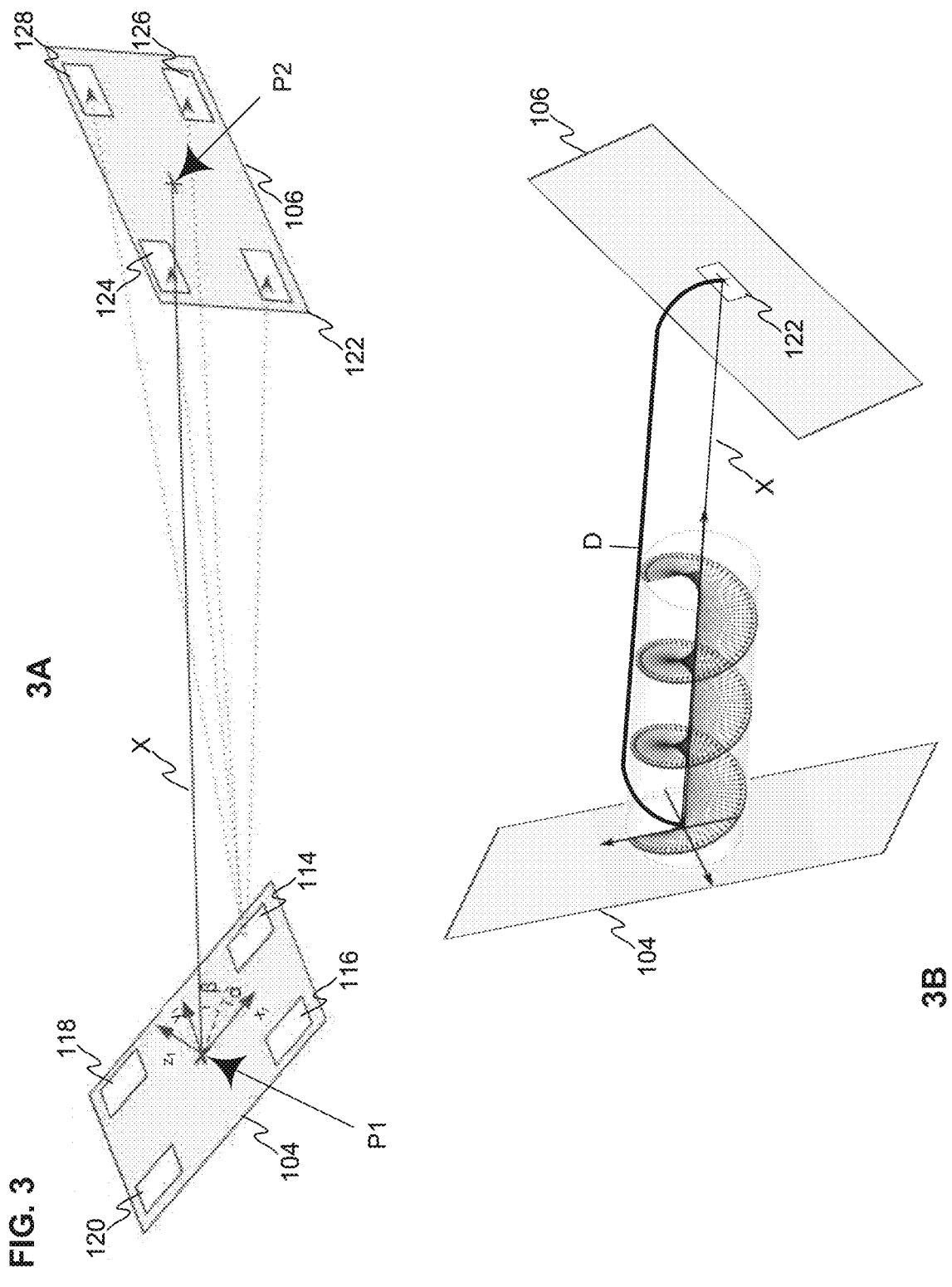

FIG. 1 schematically portrays an arrangement 100 according to one embodiment of the invention. The arrangement comprises at least a first antenna unit (AU) 104 and a second antenna unit 106, which are respectively associated with a first radio unit 108 and second radio unit 110. An antenna unit 104, 106 may be comprised in a radio unit 108, 110 or be coupled to a radio unit via e.g. cables. An antenna unit may comprise one or more antennas, and is not shown in detail in FIG. 1. Exemplary antenna units are depicted in further detail in FIG. 3.

An arrangement 100 may also comprise some other number of antenna units and radio units, such as a third radio unit and a fourth radio unit etc. Each pair of antenna units that transmits and receives one or more signals among themselves may be considered to be separated by a baseline or distance D, which will generally herein refer to a distance between the antenna units, or at least between their reference points (points on the antenna units to which e.g. transmission or receiving of signals may be reduced, such as a geometric center on the antenna unit plane with respect to antenna element positions). In an arrangement the distance between each pair of antenna units may be evaluated.

The radio units 108, 110 are coupled to at least one processor 102. The processor 102 may be a controller unit that is external to the radio units 108, 110, and may be implemented as a microprocessor unit or provided as a part of a larger computing unit such as a personal computer. Yet in some embodiments, the processor 102 may be comprised in or be considered to be part of a radio unit 108, 110.

The processor 102 may be configured to control the radio units and/or antenna units comprised in an arrangement 100. The processor 102 may additionally receive data from the antenna units 104, 106 or radio units 108, 110 and utilize received data in any information determination that is carried out. The processor 102 may also comprise or have access to one or more databases or memory units comprising additional data. Such additional data may e.g. comprise complex (amplitude and phase) antenna gain pattern or antenna phase pattern calibration data for one or more antenna unit types.

Figure 2:
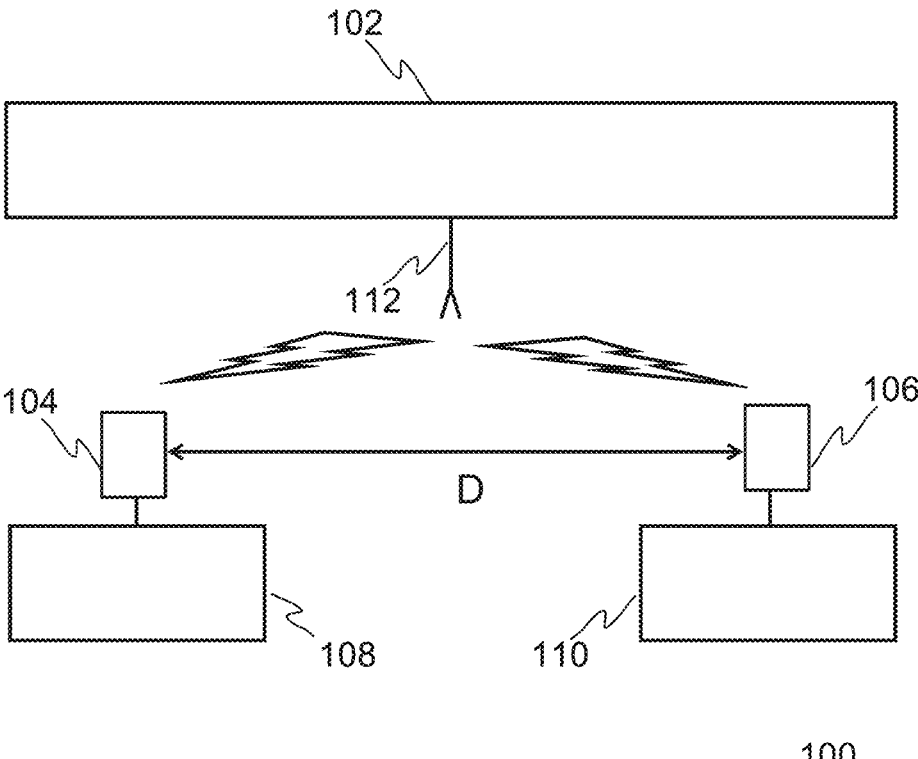
FIG. 2 shows one more exemplary arrangement according to an embodiment of the invention, FIG. 3 portrays a first antenna unit and a second antenna unit according to one embodiment of the invention and shows a circularly polarized signal.

The processor 102 may additionally or alternatively be configured to receive data from the antenna units and/or radio units comprised in an arrangement 100 in a wired (e.g. Ethernet) or wireless (e.g. WLAN) manner. FIG. 2 shows an embodiment of an arrangement 100 where the processor 102 is wirelessly coupled to the radio units 108, 110. A processor 102 may be associated with a processor antenna unit 112.

The processor 102 and radio units 108, 110 may be powered using for instance power-over-Ethernet (POE), direct mains supply, batteries, solar panels, or mechanical generators (e.g. in wind turbine blades).

In some embodiments, also a remote processor may be utilized in an arrangement 100, e.g. in addition to the processor 102 which may be a local processor or the processor 102 may be realized as a remote processor with no need for a local processor. A remote processor may receive any of the data obtained and could e.g. perform at least a portion of the determination of data that is carried out by the arrangement 100. A remote processor may refer to a processor which may be accessed through cloud computing or the remote processor may e.g. refer to a virtual processor comprised in a plurality of locations which may be configured to execute procedures presented herein through parallel processing means.

The first antenna unit 104 is configured to send at least a first signal having a first circular polarization. The first circular polarization may be e.g. left hand circular polarization (LCP). The first signal and any subsequent transmitted signals may be radio frequency signals. The signals may be unmodulated RF signals (i.e. a sinusoid), combs of RF sinusoids spanning a frequency range, or RF signals modulated by any known (complex) sequence.

The frequency of the first signal and subsequent signals may for instance be under 10 GHz. An arrangement 100 is however not limited to any frequency range. For example, 60 GHz may be utilized. In cases of high frequency, the quality of a local oscillator of the radio units may be a factor that should be considered. To be able to utilize e.g. 60 GHz frequencies, for instance a 5PPB oscillator may be of sufficient quality.

Frequencies used for at least the first signal, first response signal, second signal, and second response signal should essentially correspond to each other. If the arrangement is configured to transmit subsequent signals (to determine subsequent phase information indicative of the distance between the antenna units at a subsequent time), the signal frequency may be the same as used for e.g. the first signal or the frequency may be varied.

The duration of the first signal (and any subsequent signals transmitted/sent by any of the radio/antenna units of the arrangement) may for instance be between 10 and 10 000 μs depending on e.g. the length of the distances between the antenna/radio units, the time intervals between measurement cycles, and/or the quality of local oscillators (LOs) comprised in the radio units 108, 110. A duration of a signal may for instance be about 100 μs.

Notice that depending on the system, time evolution, i.e. phase rotation, in the signals across the measurement sequence may be compensated for. Such phase rotation may be caused by either difference in local oscillator frequencies or movement of the antenna units (Doppler). Estimating and compensating for the local oscillator frequency differences or Doppler may be carried out using additional signalling, such as repetition in time of the signals, but the techniques are well known and out of scope of the present invention.

The first signal is then received at the second radio unit 110 via the second antenna unit 106. Based on the received first signal, at least first phase information related to the first signal is determined, said first phase information being indicative of a phase of the received first signal with respect to a local oscillator of the second radio unit 110.

To be precise, typically the signal frequency is higher than the local oscillator frequency and the phase measurement often occurs in digital baseband using e.g. fast Fourier transform (FFT). Essentially, this is equivalent to measuring the phase against the local oscillator that can, for simplicity, be understood to operate at the signal frequency.

If an arrangement 100 comprises further radio and antenna units such as e.g. a third radio unit associated with a third antenna unit, then the first signal may also be received at the third radio unit (via the third antenna unit) and respective first phase information could be determined also at the third (and subsequent) radio units.

Arrangements with two or more antenna units may be utilized for determination of relative positions between the antenna units. The relative distances may be determined e.g. a number of times to track or monitor changes between the distances, such as tracking a three-dimensional geometry involving three or more antenna units. Embodiments of an arrangement may be used in terrestrial positioning, for instance.

The second radio unit 110 is configured to transmit at least a first response signal via the second antenna unit 106. The first response signal may be equivalent to the first signal or essentially correspond to the first signal at least in frequency and polarization.

The first response signal is received at the first radio unit 108, via the first antenna unit 104. Based on the received first response signal, at least first response phase information is determined, said first response phase information being indicative of a phase of the received first response signal with respect to a local oscillator of the first radio unit 108.

The first phase information and first response phase information is then used to determine (by the processor 102) at least a first phase sum being indicative of a sum of the first phase information and the first response phase information.

Yet again, if the arrangement comprises further radio and antenna units, an e.g. third antenna unit may be configured to also transmit a signal corresponding to the first response signal, which may be received at at least the first antenna unit, preferably at all other non-transmitting antenna units, while respective first response phase information may be determined regarding the received first response signals. Of course, the third antenna unit may receive the first response signal that is transmitted by the second antenna unit 106 and determine respective phase information. A plurality of first phase sums may therefore be determined.

The first radio unit 108 may also be configured to send at least a second signal having a second circular polarization via the first antenna unit 104. The second circular polarization is different from the first circular polarization and may thus be e.g. right-hand circular polarization (RCP).

The second signal may then be received at the second radio unit 110 via the second antenna unit 106. Based on the received second signal, at least second phase information related to the second signal is determined, said second phase information being indicative of a phase of the received second signal with respect to a local oscillator of the second radio unit 110.

The second radio unit 110 may be configured to transmit at least a second response signal via the second antenna unit 106. The second response signal may be equivalent to the second signal or essentially correspond to the second signal at least in frequency and polarization.

The second response signal is received at the first radio unit 108, via the first antenna unit 104. Based on the received second response signal, at least second response phase information is determined, said second response phase information being indicative of a phase of the received second response signal with respect to a local oscillator of the first radio unit 108.

The second signal could also be transmitted by the second antenna unit and received by the first antenna unit, while the second response signal would be transmitted by the first antenna unit and received by the second antenna unit. When the transmission sequence (which antenna unit transmits which signal) is known, time dependencies due to Doppler shifts may be compensated.

The second phase information and second response phase information is then used to determine at least a second phase sum being indicative of a sum of the second phase information and the second response phase information.

Based on the first phase sum and second phase sum, at least one distance indicator may be determined that is indicative of the distance D between the first antenna unit 104 and the second antenna unit 106 (or at least the distance between their reference points). At least some of the possible one or more distance indicators may be independent of a rotation angle between the LOS axis of the antenna units, as will be demonstrated below.

An arrangement 100 thus comprises at least one pair of antenna units that has mutually transmitted and received at least two signals and their response signals among each other, such that the two-way transmissions allow determination of two-way phase information and its sums.

In embodiments of an arrangement 100 comprising further radio units and antenna units, such as a third radio unit and associated third antenna unit, the further antenna units may be configured to receive the second signal and possibly also second response signal transmitted by at least the second antenna unit 108, determine respective second phase information, and transmit a second response signal. A plurality of second phase sums and a plurality of distance indicators (based on the plurality of first phase sums and second phase sums, for each respective evaluated distance) may then be determined.

Any antenna unit of an arrangement may be configured to receive any or all of the signals transmitted by the other antenna units of the arrangement. In one embodiment, each of the transmitting antenna units may transmit its signal in a predetermined time slot as a broadcast, while the other antenna units receive the signal.

An arrangement may therefore comprise a plurality of antenna units, such that the arrangement comprises a plurality of pairs of antenna units that are configured to perform two-way transmissions of first and second signals comprising first polarization and first and second response signals comprising second polarization. Respective two-way phase information regarding the received transmissions may be determined to obtain first phase sums and second phase sums relating to each pair of antenna units that has transmitted and received among themselves the first and second signals comprising first polarization and first and second response signals comprising second polarization. A plurality of respective distance indicators may thus be determined, where the distance indicators are each indicative of the distance between the antenna units in each pair of antenna units.

In one embodiment, each of the transmitting antenna units may transmit at least one signal within a predetermined time slot, further wherein the first antenna unit may be a master unit and the second antenna unit (and any other remaining ones) is a slave unit. The master unit may be an antenna unit that is configured to transmit the first signal. The master unit may be configured to check before transmission of the first signal whether a radio channel is free for transmission and if the channel is free, the at least first signal is transmitted, said transmitting not being executed if the channel is not free.

An arrangement may advantageously utilize radio bands/channels that require listen-before-talk functionality, as a master unit may check if the radio channel is free before transmission of the first signal and if yes, then the measurement cycle of the arrangement may be carried on with and the radio channel may then be reserved by the arrangement for at least the one measurement cycle. If it is determined that a radio channel is not free, then the first signal may not be transmitted and the measurement cycle may be aborted or cancelled without any signals being transmitted, while the master unit or first antenna unit may then wait for a predetermined time between measurement cycles and then at the next measurement cycle, once more check if the radio band is free and then carry on with transmission of the first signal to initiate a measurement cycle if the radio band is free.

In some embodiments comprising a master antenna unit and one or more slave antenna units, the slave units may be configured to determine, before transmitting of a signal in a given measurement cycle, if a previous antenna unit in the predetermined order of antenna units has transmitted a signal in the measurement cycle, and if yes, transmit their respective signal, while the signal is not transmitted (waiting for a full measurement cycle) if it is determined that the previous antenna unit has not transmitted a signal, i.e., if a valid measurement signal is not received.

In embodiments of an arrangement, the at least first antenna unit may send a time synchronization signal that is received by the at least remaining radio antenna units before sending of the first signal. Through the time synchronization, the antenna units may conduct transmission of signals in synchronized manner having regard to time slots associated with a predetermined order in which signals are to be transmitted, especially in embodiments where the time between subsequent measurement cycles is relatively long, such as over one minute.

Processing of information and steps carried out may be conducted in different order than that which is proposed here. For instance, the first signal could be a RCP signal and the second signal an LPC signal.

In some embodiments, the first signal and second signal could be transmitted before the first response signal and second response signal.

In one other embodiment of the invention, the first signal and second signal could be transmitted simultaneously (and thus in the same time slot). The first response signal and the second response signal could additionally or alternatively be transmitted simultaneously. With simultaneous transmission of signals comprising left and right circular polarizations, coded transmissions would be utilized.

FIG. 3A shows an exemplary first antenna unit 104 and second antenna unit 106 that may be comprised in an arrangement 100 according to an embodiment of the invention. Here, both antenna units 104, 106 comprise four antenna elements each. The first antenna unit 104 comprises a first antenna element 114, a second antenna element 116, a third antenna element 118, and a fourth antenna element 120. The second antenna unit 106 comprises a first antenna element 122, a second antenna element 124, a third antenna element 126, and a fourth antenna element 128. First and second antenna units may also comprise different numbers of antenna elements. An antenna unit 104, 106 may comprise only one dual-polarized antenna element, at least in connection with antenna elements having high phase center stability with respect to signal direction.

If the antenna elements do not have high phase performance, the antenna units 104, 106 preferably comprise at least three antenna elements 114, 116, 118, 120, 122, 124, 126 each. In this case the direction of arrival of the signals may be determined, which is preferably carried out if the phase center of the antenna elements is not constant.

If an antenna unit 104, 106 comprises a plurality of antenna elements 114, 116, 118, 120, 122, 124, 126, all antenna elements of the antenna unit preferably receive the signal or signals that are transmitted by the other antenna unit in the pair of antenna units 104, 106. Any or all antenna elements in an antenna unit may also transmit e.g. the first and/or second signals, yet it may be more efficient if all antenna elements of an antenna unit are used for receiving signals while only one of the antenna elements is used for transmission.

In the example of FIG. 3A, for the first antenna unit 104, the first antenna element 114 may be a transmitting and receiving (TX/RX) antenna element, while the second antenna element 116, third antenna element 118, and fourth antenna element 120 may be receiving antenna elements. For the second antenna unit 106, the first antenna element 122 may be a transmitting and receiving (TX/RX) antenna element, while the second antenna element 124, third antenna element 126, and fourth antenna element 128 may be receiving (RX) antenna elements.

The first antenna unit 104 and second antenna unit 106 may both each comprise at least one RCP feed and one LCP feed, while each antenna element may either have single or multiple polarization feeds. The TX/RX elements 114, 122 should have feeds for both polarizations.

FIG. 3A also shows a reference point of the first antenna unit P1 and a reference point of the second antenna unit P2. The measurements that are carried out may be reduced to the reference points. The reference points P1 and P2 are considered to be connected by a connecting line X (the LOS axis), the length of which corresponds to the distance D between the antenna units.

The LOS axis X forms an angle $\beta$ with the plane in which the antenna unit lies, e.g. plane $x_1$, $y_1$ for the first antenna unit 104. The projection of LOS axis X to the plane $x_1$, $y_1$ forms an angle $\alpha$ with the $x_1$ axis. These angles $\alpha$ and $\beta$ can be obtained through direction of signal/arrival (DOA) measurement methods. The axis $z_1$ denotes the normal of the surface of the first antenna unit 104.

However, the rotation of the antenna unit with respect to the LOS axis X cannot be obtained or evaluated with the DOA methods, but this rotation will still affect the determination of phase information when using circularly polarized signals, and should be accounted for in order to obtain more accurate phase information.

FIG. 3B illustrates, as an example, a circularly polarized signal originating from a first antenna 104 with a first antenna element 114 (not shown in figure), where the signal may be received at a second antenna unit 106 with a first antenna element 122. Only first antenna elements 114, 122 are considered for simplicity. FIG. 3B illustrates the transmission of a circularly polarized signal for the purpose of demonstrating that the rotation antenna units will affect the signal and a determined phase. As will be understood by the skilled person, rotation of e.g. the first antenna unit 104 with respect to the second antenna unit 106 will affect the phase of the received signal at the second antenna unit 106 and therefore the determined phase information, and a determined distance indicator and thus evaluated distance D, even though the distance D between the antenna units will stay the same.

Figure 4:
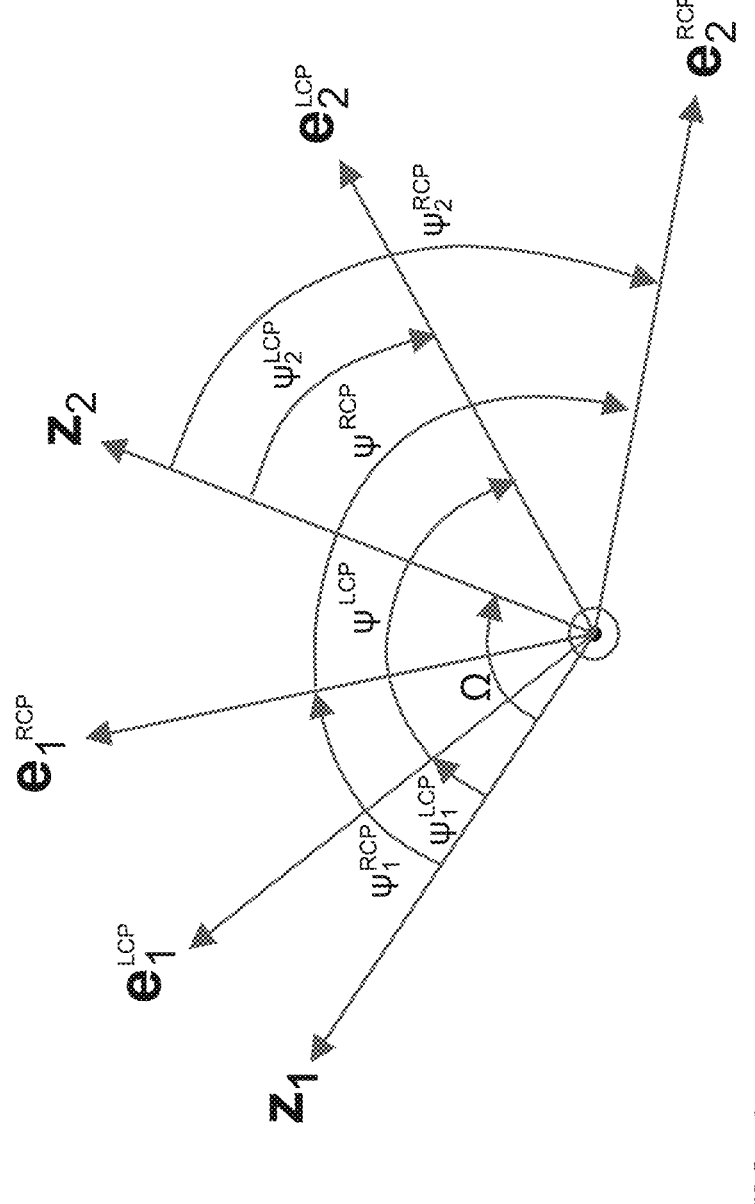
FIG. 4 shows orientations of the first and second antenna units along the connecting line as well as the electric vector reference directions (as unit vectors e) for both antenna units and their LCP and RCP feeds.

FIG. 4 shows orientations of the first and second antenna units along their connecting line (the LOS axis), which is considered as normal to the page. The orientations are depicted having regard to the unit vector of the normal of the first antenna unit $z_1$ and the unit vector of the normal of the second antenna unit $z_2$. The electric vector reference directions (as unit vectors e) for both antenna units and their LCP and RCP feeds are also shown, where for instance, $e_1^{LCP}$ corresponds to a direction of a unit vector of the LCP feed of the first antenna unit 104. The signs of the terms that are given further below are for the case where the first antenna unit 104 is below the second antenna unit 106 along the page normal.

Figure 5:
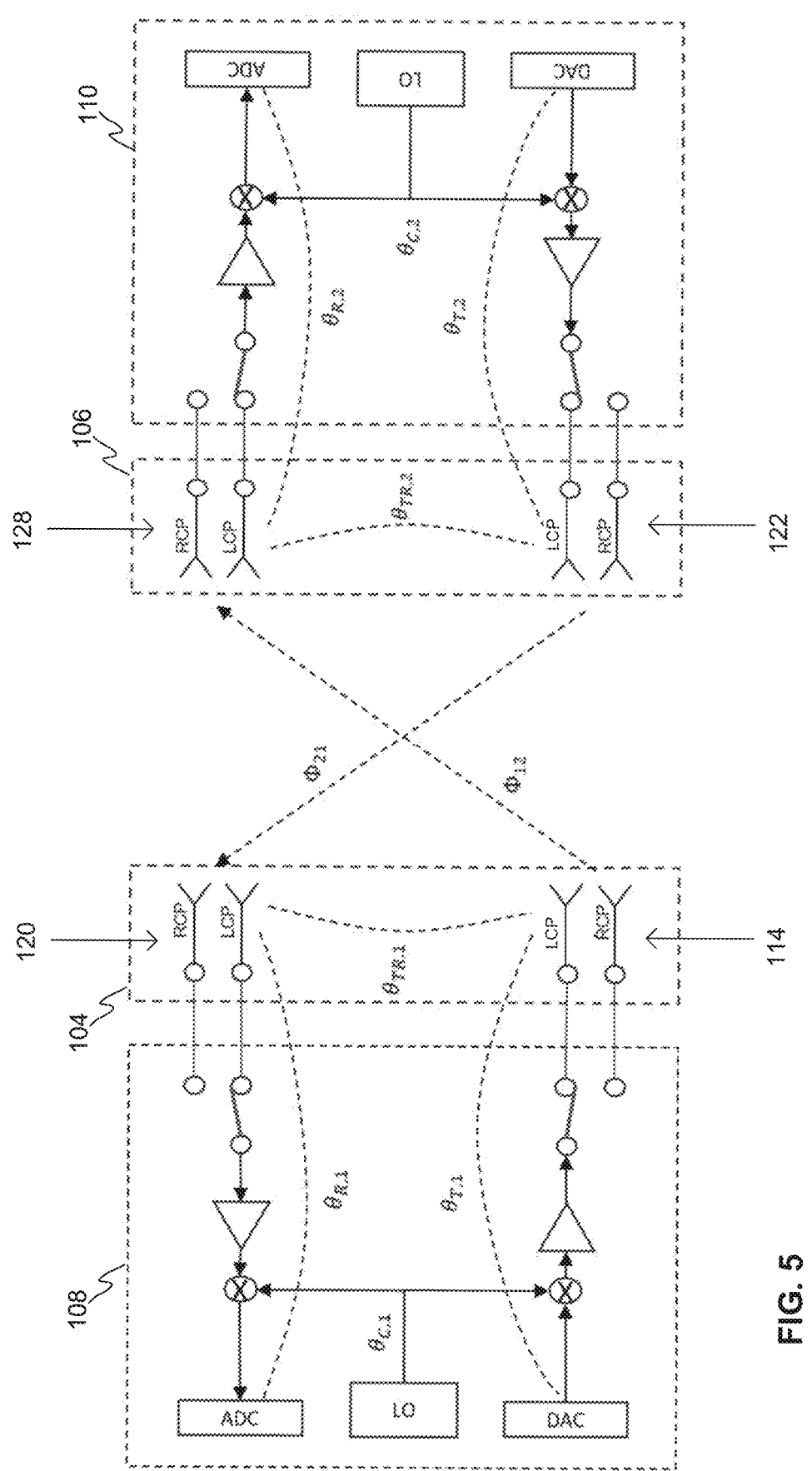
FIG. 5 shows a first radio unit, first antenna unit, second radio unit, and second antenna unit.

FIG. 5 depicts a first radio unit 104, first antenna unit 104, second radio unit 110, and second antenna unit 106. In this example, the first antenna unit 104 comprises antenna elements that correspond to the first antenna element 114 and fourth antenna element 120 of FIG. 3. The second antenna unit 106 comprises antenna elements that correspond to the first antenna element 122 and fourth antenna element 128. The TX/RX switch of FIG. 4 is assumed to be in 'TX' position.

The discussion below is considered for a case when the first antenna element of the first antenna unit 114 transmits the first and second signals, which are received by the fourth antenna element of the second antenna unit 128, and the first antenna element of the second antenna unit 122 transmits the first and second response signals, which are received by the fourth antenna element of the first antenna unit 120. If an antenna unit 104, 106 comprises more than two antenna elements, similar considerations apply to the other antenna elements. The separate determined e.g. phase information and/or distance indicators may be combined to obtain information (such as distance indicator) that corresponds to information regarding corresponding reference points of the antenna units 104, 106.

The first antenna unit 104 may transmit a first signal with e.g. LCP polarization via its first antenna element 114 in its own time slot at time $T_1$. The phase of the transmitted signal that is received at the second antenna unit 106 at the fourth antenna element 128, i.e. the first determined phase information is:

$$\varphi_{12}^{LCP} = \Theta_{C,1} - \Theta_{T,1}^{LCP} - \Psi^{LCP} - \Phi_{12} - \Theta_{R,2}^{LCP} - \Theta_{C,2}, \tag{1}$$

where $\Theta_{C,1}$ and $\Theta_{C,2}$ are the phases of the local oscillators of the first and second radio units 108, 110, respectively (at the time of transmission $T_1$ for the first radio unit 108). Note that the indices refer to the antenna units, not the antenna elements. $\Phi_{12}$ is the geometric phase corresponding to the distance or baseline or connecting geometric line between the transmission antenna element 114 of the first antenna unit 104 and the receiving antenna element 128 of the second antenna unit 106.

$$\Theta_{T,1}^{LCP}$$

and $$\Theta_{R,2}^{LCP}$$

are the transmit and receive branch phase lengths corresponding to the first antenna unit 104 and second antenna unit 106, respectively (with phase length referring here to the phase shift that occurs in a signal traversing along a certain distance). $\Psi^{LCP}$ is the angle between the electric vector reference planes of the LCP feeds of the two antenna elements 114

$$(\text{the plane formed by } X \text{ and } e_1^{LCP})$$

and 128

$$(X \text{ and } e_2^{LCP}),$$

as illustrated in FIG. 4.

The transmit and receive branch phase lengths, e.g.

$$\Theta_{T,1}^{LCP}$$

and $$\theta_{R,2}^{LCP}$$

comprise the phase lengths that are due to the physical lengths of the transmit and receive branches of the antenna units and the associated radio units, comprising also possible cable lengths. For instance, as seen in FIG. 5, the phase length $$\Theta_{T,1}^{LCP}.$$

corresponds to the length of transmission branch of the first radio unit 108 from the digital-analog converter (DAC) to the transmission antenna 114. One should note that the phase length between the DAC and the mixer corresponds to much lower frequency (baseband frequency) than the phase length between the mixer and the antenna. Also, one should note that the phase length from the local oscillator to the mixer should be accounted for. It is assumed here that all these effects are included in the term $$\Theta_{T,1}^{LCP}.$$

A first response signal may then be transmitted by the first antenna element of the second antenna unit 122 and received by the fourth antenna element of the first antenna unit 120 in the respective time slot at time $T_2$. The determined/measured first response phase information relating to the receiving first antenna unit (at the fourth antenna element 120) is (assuming that the second antenna unit 106 transmits the response signal with zero phase with respect to its local clock/oscillator):

$$\varphi_{21}^{LCP} = \Theta_{C,2} - \Theta_{T,2}^{LCP} - \Psi^{LCP} - \Phi_{21} - \Theta_{R,1}^{LCP} - \Theta_{C,1}, \tag{2}$$

where $\Theta_{C,2}$ and $\Theta_{C,1}$ are the phases of the LOs of the second and first radio units 110, 108, respectively at the time of transmission $T_2$ for the second radio unit 110. For simplicity, in the following treatment it is assumed that the phase relationship $\Theta_{C,2}-\Theta_{C,1}$ between radio nodes 108 and 110 remains the same between the transmissions. Typically this is not the case as the radio nodes have independently running clocks. However, with moderately good clocks the rate of change of this phase relationship is constant in time and can easily be determined with repeated measurements and, hence, can readily be compensated for. $\Phi_{21}$ is the geometric phase corresponding to the distance between the transmission antenna, here the first antenna element of the second antenna unit 122 and the receiving antenna, here the fourth antenna element of the first antenna unit 120.

$$\Theta_{T,2}^{LCP}$$

and $$\Theta_{R,1}^{LCP}$$

are the transmit and receive branch phase lengths corresponding to the second antenna unit 106 and first antenna unit 104, respectively. $\Psi^{LCP}$ is as defined previously. It is assumed here that the rotation between the antenna units 104 and 106 does not change significantly between the transmissions. This is a valid assumption as a typical time between the transmissions is on the order of 100 micro seconds.

A second signal comprising RCP polarization may then be transmitted from the first antenna element of the first antenna unit 114 (it the allocated time slot at time $T_3$) and received at the fourth antenna element of the second antenna unit 128. The determined second phase information is then:

$$\varphi_{12}^{RCP} = \Theta_{C,1} - \Theta_{T,1}^{RCP} + \Psi^{RCP} - \Phi_{12} - \Theta_{R,2}^{RCP} - \Theta_{C,2}. \tag{3}$$

Here $\Psi^{RCP}$ is similar to $\Psi^{LCP}$ as seen from FIG. 4, but for the RCP feeds. A second response signal is transmitted by the first antenna element of the second antenna unit 122 and received by the fourth antenna element of the first antenna unit 120 in the respective time slot at time $T_4$. The determined second response phase information is:

$$\varphi_{21}^{RCP} = \Theta_{C,2} - \Theta_{T,2}^{RCP} + -\Psi^{RCP} - \Phi_{21} - \Theta_{R,1}^{RCP} - \Theta_{C,1}, \tag{4}$$

The branch phase terms, for example $$\Theta_{R,1}^{LCP}$$

can be eliminated by way of self-measurement or self-calibration data indicative of a phase of a self-measurement signal that is received at a transmitting antenna unit during transmission of a signal. For instance, as the first antenna element of the first antenna unit 114 transmits the first signal, the fourth antenna element of the first antenna unit 120 may determine a first self-measurement phase as $$\varphi_{11}^{LCP} = -\Theta_{T,1}^{LCP} - \Theta_{TR,1}^{LCP} - \Theta_{R,1}^{LCP}. \tag{5}$$

When the first antenna 104 unit transmits the second signal, self-measurement phase information may be determined as:

$$\varphi_{11}^{RCP} = -\Theta_{T,1}^{RCP} - \Theta_{TR,1}^{RCP} - \Theta_{R,1}^{RCP}. \tag{6}$$

Here, $\Theta_{TR,1}$ is the phase of the signal transfer function between the first antenna element of the first antenna unit 114 (the transmitting antenna element) and the fourth antenna element of the first antenna unit 120 (the receiving antenna element). These stable phase terms, such as $\Theta_{TR,1}$, may be measured for one antenna unit e.g. in an anechoic chamber and this measurement data may be used to eliminate their impact on the self-calibration phase data such as $$\phi_{11}^{RCP},$$

assuming that they are approximately the same in all similar antenna units. Because of this, $\Theta_{TR,i}$ for antenna unit i may be omitted or compensated for in further calculations. The second antenna unit 106 may determine self-measurement phase information accordingly.

A first phase sum $S_1$ may be determined as:

$$S_1 = \varphi_{12}^{LCP} + \varphi_{21}^{LCP} - \varphi_{11}^{LCP} - \varphi_{22}^{LCP} = -(\Phi_{12} + \Phi_{21}) - 2\Psi^{LCP}, \quad (7)$$

while a second phase sum $S_2$ may then be:

$$S_2 = \varphi_{12}^{RCP} + \varphi_{21}^{RCP} - \varphi_{11}^{RCP} - \varphi_{22}^{RCP} = -(\Phi_{12} + \Phi_{21}) + 2\Psi^{RCP}. \quad (8)$$

The phase sums may also be computed without the self-measurement phase information, especially in cases where the transmit and receive branches are known to be stable and their lengths known and compensated for elsewhere.

Yet, it should be noted that in cases where an arrangement comprises a plurality of antenna units, each transmitting antenna unit may determine respective self-calibration/self-measurement phase information.

As may be determined from FIG. 4:

$$\Psi^{LCP} = \Omega - \Psi_1^{LCP} + \Psi_2^{LCP} \quad (9)$$

and $$\Psi^{RCP} = \Omega - \Psi_1^{RCP} + \Psi_2^{RCP}, \quad (10)$$

where $\Omega$ is the angle of rotation along the LOS axis between the first antenna unit 104 and the second antenna unit 106, and $$\Psi_i^{LCP}$$

and $$\Psi_i^{RCP}$$

are the angles between the z axis and the electric reference vectors $$e_i^{LCP}$$

and $$e_i^{RCP}$$

as measured along the LOS axis (signal direction) for antenna unit i and respective polarization feeds.

$$\Psi_i^{LCP}$$

and $$\Psi_i^{RCP}$$

can also be understood as the phase responses of respective polarization feeds in the given direction.

A first distance variable $V_D$ may be determined, as a distance indicator, based on the first and second phase sums $S_1$, $S_2$, e.g. as a sum of them. Utilizing the above, $$V_D = S_1 + S_2 \quad (11)$$

$$\varphi_{12}^{LCP} + \varphi_{21}^{LCP} + \varphi_{12}^{RCP} + \varphi_{21}^{RCP} - \varphi_{11}^{LCP} - \varphi_{22}^{LCP} - \varphi_{11}^{RCP} - \varphi_{22}^{RCP} =$$
$$-2(\Phi_{12} + \Phi_{21}) + 2(\Psi_1^{LCP} - \Psi_1^{RCP}) - 2(\Psi_2^{LCP} - \Psi_2^{RCP}).$$

It can be seen that the rotation between the antenna units $\Omega$ cancels, assuming that there has been no significant change in rotation between the transmissions. This is a safe assumption for tracking of typical objects, such as e.g. forklifts, considering that the time between the transmissions can be on the order of 100 microseconds. Therefore, the geometric phase length between reference points of the first antenna unit and second antenna unit, $\frac{1}{2}$ $(\Phi_{12}+\Phi_{21})$, may be determined from the sum of self-calibrated phase measurements as can be easily derived from equation (11) using the first distance variable $V_D$.

The remaining feed-specific phase response parameters $$\Psi_i^{LCP}$$

and $$\Psi_i^{RCP}$$

are dependent on the signal direction. If the antenna units have good phase performance, meaning that the antenna phase center remains essentially constant independent of the signal direction, one can write for antenna unit i:

$$\Psi_i^{LCP}(\alpha, \beta) \sim 0, \Psi_i^{RCP}(\alpha, \beta) \sim 0 \qquad (12)$$

Consequently, the phase lengths such as $\Phi_{12}$ may be derived directly from the (self-calibrated) phase sums $S_1$, $S_2$ as can be seen from equation (13).

Yet, if approximations (12) do not hold, it may be possible to measure the phase responses $$\Psi_i^{LCP}$$

$(\alpha, \beta)$ and $$\Psi_i^{RCP}$$

$(\alpha, \beta)$ of the antenna feeds e.g. in an anechoic chamber to obtain antenna phase pattern calibration data. Such calibration data may be obtained via measurements or obtained from an external source and/or stored in a database. Assuming the antenna units are sufficiently similar, quite typical in mass production, it may be assumed that the antennas have essentially similar patterns on their feeds. If the direction of signal $(\alpha, \beta)$ is known in the antenna unit coordinate system, $$\Psi_i^{LCP}$$

$(\alpha, \beta)$ and $$\Psi_i^{RCP}$$

$(\alpha, \beta)$ may be interpolated from stored antenna phase pattern calibration data and used to obtain $\frac{1}{2} (\Phi_{12}+\Phi_{21})$ indicative of the distance between the antenna unit reference points from the preferably self-calibrated phase sum measurements as follows:

$$\frac{1}{2}(\Phi_{12} + \Phi_{21}) = -\frac{1}{4}(S_1 + S_2) + \frac{1}{2}(\Psi_1^{LCP} - \Psi_1^{RCP}) - \frac{1}{2}(\Psi_2^{LCP} - \Psi_2^{RCP}). \qquad (13)$$

Some examples of determining the direction of signal (direction of arrival) include: 1) applying direction of arrival algorithms (e.g. beamforming or subspace-based methods such as MUSIC) on the signals received from multiple receive antennas, or 2) tracking the positions and orientations of the antenna units, or a combination of these. The interpolation of the antenna phase response for the determined signal direction from the antenna phase pattern calibration data may be modeled based on well known techniques such as vector spherical harmonics or 2D-FFT based decompositions calculated from measurement data.

Yet in another embodiment, it is also possible to explicitly determine the rotation angle $\Omega$. This can be done by determining, as a distance indicator, a rotation variable VR by forming a difference of the phase sums as follows:

$$V_R = S_1 - S_2 = -4\Omega + 2(\Psi_1^{LCP} + \Psi_1^{RCP}) - 2(\Psi_2^{LCP} + \Psi_2^{RCP}) \qquad (14)$$

The $\Psi$ terms that depend on the signal direction can be obtained as discussed above. This allows the rotation angle between the antenna units $\Omega$ to be determined from the (self-calibrated) phase sums:

$$\Omega = \frac{1}{2}(\Psi_1^{LCP} + \Psi_1^{RCP} - \Psi_2^{LCP} - \Psi_2^{RCP}) - \frac{1}{4}(S_1 - S_2) \qquad (15)$$

The advantage of determining $\Omega$ explicitly is that it can be then tracked with an estimation algorithm, such as a Kalman or particle estimator, and the estimate can be used for the elimination of the rotation effect in a single polarization measurement:

$$S_1 = \varphi_{12}^{LCP} + \varphi_{21}^{LCP} - \varphi_{11}^{LCP} - \varphi_{22}^{LCP} = \qquad (16)$$
$$-(\Phi_{12} + \Phi_{21}) - 2\Psi^{LCP} = -(\Phi_{12} + \Phi_{21}) - 2(\Omega - \Psi_1^{LCP} + \Psi_2^{LCP})$$

Such an arrangement makes it possible to track the fast changing geometric phase length at a higher rate with a single polarization measurement, through transmitting only e.g. first signals and first response signals comprising a first polarization to determine first phase sums, without transmission of signals comprising second polarization. The first phase sum may be determined at selected first time intervals (e.g. 70-300, 100-250, or 150-200 times per second), from which the geometric phase length may be determined as $$\frac{1}{2}(\Phi_{12} + \Phi_{21}) = -\frac{1}{2}S_1 - \Omega + \Psi_1^{LCP} - \Psi_2^{LCP} \qquad (17)$$

The slowly varying rotation angle n may be tracked with an estimator using much more infrequent dual polarization measurements, where signals comprising first and second polarization (first signals, first response signals, second signals, and second response signals) may be transmitted at selected second time intervals (such as between 1-30 or 1-10 times per second).

Figure 6:
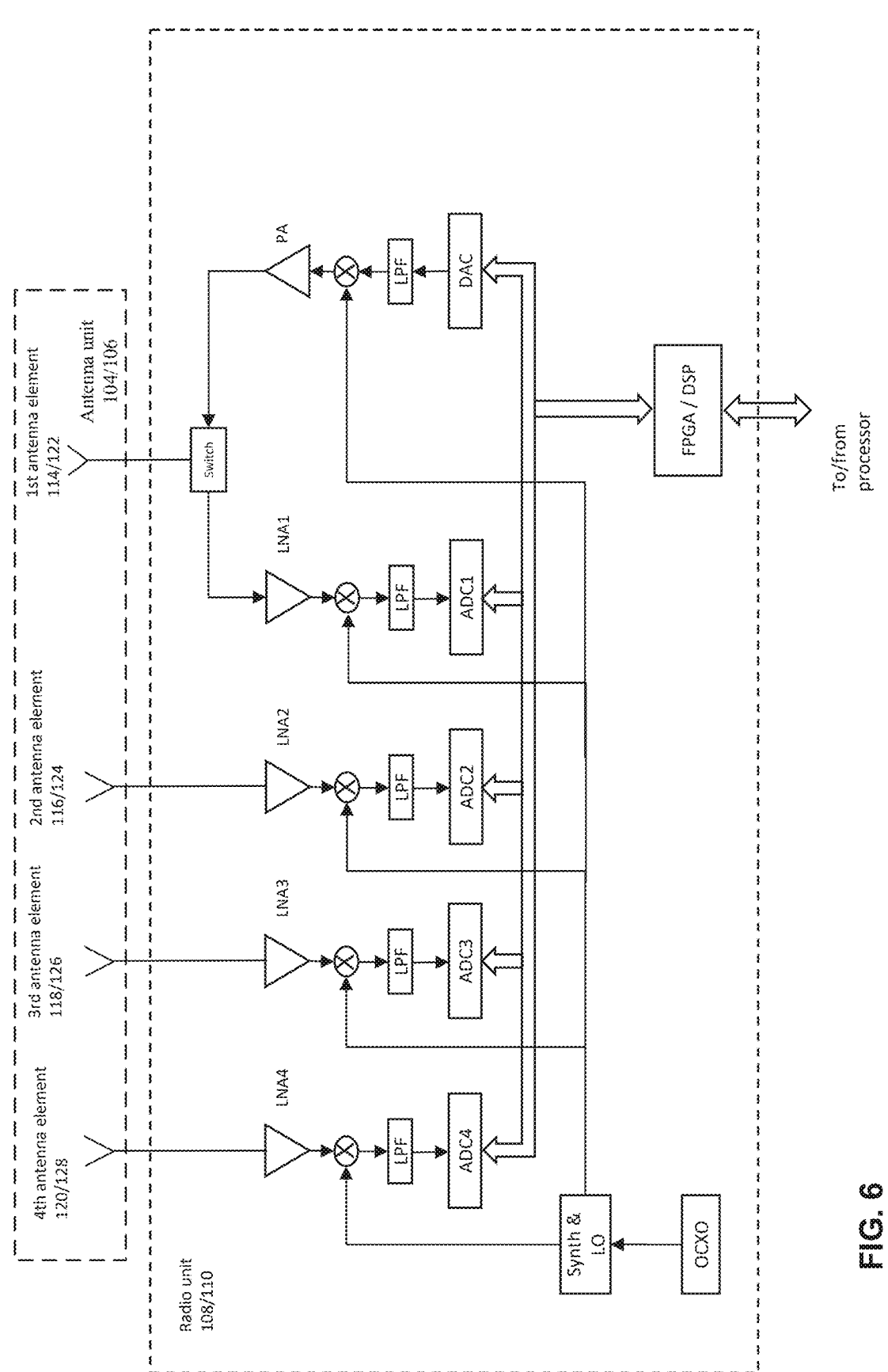
FIG. 6 illustrates one exemplary radio unit and antenna unit which may be utilized in embodiments of the invention.

FIG. 6 shows an exemplary radio unit 108, 110 and antenna unit 104, 106 comprising four antenna elements, which may be utilized in embodiments of the invention. The radio unit 108, 110 of FIG. 6 may be utilized in embodiments where self-calibration and/or direction of signal measurements are carried out.

FIGS. 7A and 7B illustrate how time slots may be allocated in measurement cycles for transmission and receiving of signals and possibly also communication of data in an arrangement 100. A measurement cycle may refer to a set of transmitted signals or a time duration within which signals are sent one after another such that the time between subsequent transmissions is below a threshold value. For instance, a first measurement cycle could comprise the transmission (and receiving) of a first signal, first response signal, second signal, and second response signal. In some embodiments, a second measurement cycle may be carried out. The second measurement cycle could e.g. be equivalent to the first measurement cycle.

One measurement cycle may comprise at least one measurement frame (with N measurement slots). During the measurement frame, the at least first antenna unit 104 and second antenna unit 106 may transmit their respective signals separately, each in their own time slot which is allocated to them. The measurement cycle of FIG. 7A is applicable to an arrangement 100 comprising N radio units, where the distance between each antenna unit may be evaluated. Each antenna unit may transmit their respective signals in their own time slot.

Transmissions may be carried out so that transmissions occur in subsequent time slots so that no empty time slots are left between the transmissions. The transmissions and time slots may also be proportioned such that there is a time interval between the end of a transmission and the start of a subsequent time slot where a subsequent antenna unit will start its transmission is below a selected maximum time interval. A time interval between the end of a transmission and the start of a subsequent transmission may be less than less than 50 μs, preferably less than 20 μs, such as less than 16 μs at least between transmissions occurring in the same measurement frame.

There may, however, be a longer time interval between the end of transmission and the start of a subsequent transmission between measurement frames. In such cases, a master unit may be configured to check if a transmission channel is free at the start of each measurement frame.

The subsequent provision of a compact transmission signal may be advantageously used in combination with e.g. WiFi networks. With the present invention, a wireless channel for the transmissions only needs to be reserved once per measurement cycle. This feature may enable compatibility of the present invention with networks such as WiFi.

Without transmissions occurring in subsequent time slots, a measurement cycle could take longer and an unknown time duration to complete. This is because one measurement cycle could not be carried out effectually as a single transmission in a wireless channel that only needs to compete for the channel once as defined e.g. in ETSI EN 301 893 (the standard specification regulating 5 GHz WiFi transmissions). The channel would have to be competed for by each transmitting antenna unit separately during transmission, which could cause arbitrarily long measurement sequences if the channel gets occupied by other users between the transmissions.

FIG. 7B shows how time slots may be allocated in measurement cycles where at least one communication frame (with one or more communication slots) is also employed. During a communication frame, signals, measured/determined data, or any other data may be transmitted to a processor 102. At least one data communication may be transmitted and multiplexed with the measurement signals transmitted by the radio units in time or frequency domain. The at least one data communication may comprise at least the determined phase information. A data communication may additionally or alternatively comprise any other information. An arrangement 100 may thus serve as a measurement arrangement and a communication network simultaneously.

The required time synchronization accuracy should preferably be better than a quarter of the duration of a possible guard time between subsequent signals in order to prevent overlapping transmissions.

Figure 8:
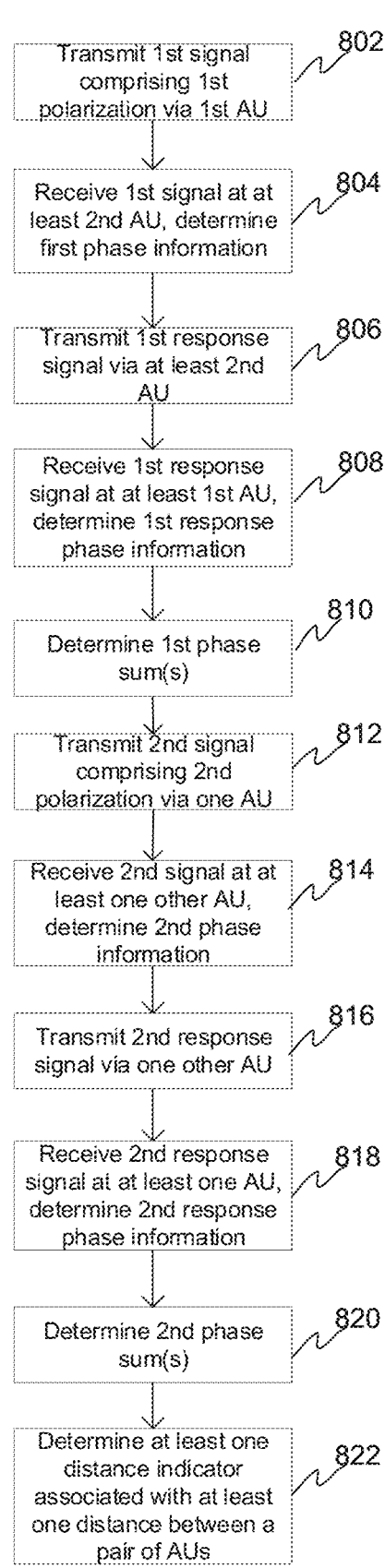

FIG. 8 shows a flow chart of one embodiment of the invention. At least a first signal comprising first polarization is transmitted 802 by a first antenna unit 104. The first signal is received by at least a second antenna unit 106 and at least first phase information is determined at 804. The first signal transmitted by the first AU 104 may also be received at any other AU comprised in an arrangement 100 to determine respective first phase information regarding the phase of the received first signal with respect to a local oscillator of the receiving antenna unit. At least one first response signal is transmitted 806 by at least the second AU 106. The first response signal essentially corresponds to the first signal. The first response signal may also be transmitted via any third or further antenna units comprised in the arrangement, with each AU preferably transmitting signals in their own predetermined time slots and preferably in predetermined order. The first response signal is received by at least the first antenna unit 104 to determine first response phase information at 808. In the case of any signal transmitted, it may be understood that the signal may be received at any non-transmitting antenna unit of the arrangement to determine respective phase information. In some cases, the signals may be received also at receiving antennas of the transmitting AU in the case where self-calibration information is also determined.

At least one first phase sum is determined 810 at least with respect to the first AU 104 and second AU 106, where the first phase sum may be a sum of the first phase information and first response phase information. First phase sums may be determined for any or all pairs of antenna units in an arrangement that have transmitted two-way signals among themselves.

At least a second signal comprising second polarization is transmitted 812 one AU. The second signal may be sent by the first antenna unit 104, the second antenna unit 106, or any other AU of the arrangement. The second signal is received by at least one other non-transmitting AU and at least second phase information is determined at 814. The second signal transmitted by one of the AUs may also be received at any other AU comprised in an arrangement 100 to determine respective second phase information regarding the phase of the received second signal with respect to a local oscillator of the receiving AU. At least one second response signal is transmitted 816 by at least one of the other antenna units which has not transmitted the second signal. The second response signal essentially corresponds to the second signal. The second response signal may also be transmitted via further antenna units comprised in the arrangement (not transmitting the second signal), with each AU preferably transmitting signals in their own predetermined time slots and preferably in predetermined order. The second response signal is received by at least one of the antenna units to determine second response phase information at 818.

At least one second phase sum is determined 820 at least with respect to the first AU 104 and second AU 106, where the second phase sum may be a sum of the second phase information and second response phase information.

Second phase sums may be determined for any or all pairs of antenna units in an arrangement that have transmitted two-way signals among themselves.

At least one distance indicator is determined 822, the at least one distance indicator being indicative of the distance between at least the first antenna unit 104 and the second antenna unit 106. At least one distance indicator may be determined regarding each pair of antenna units that have transmitted two-way signals among themselves with respect to a first and second polarization, i.e. including at least first signal, first response signal, second signal, and second response signal.

Figure 9:
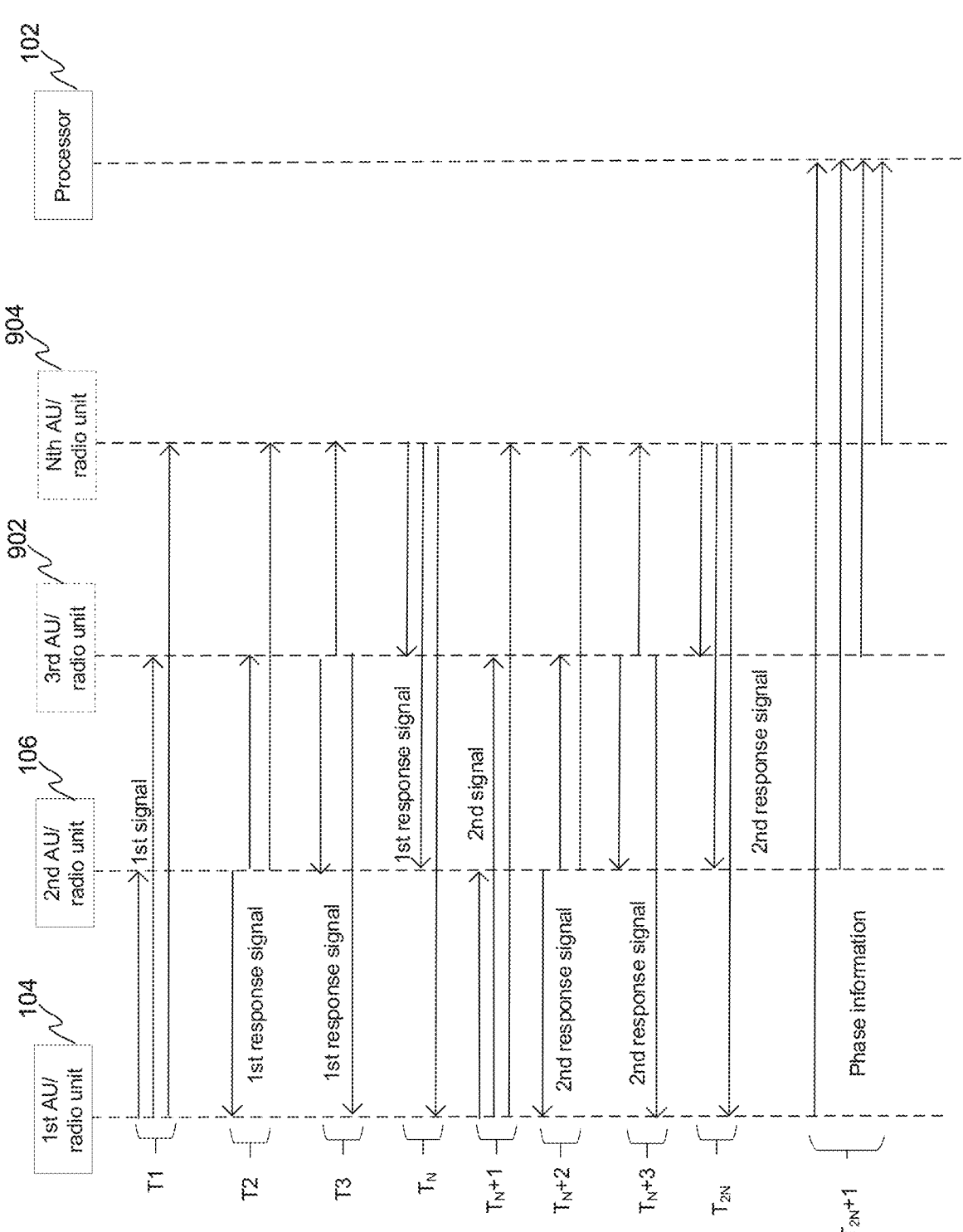
FIG. 9 shows a Message Sequence Chart relating to a method according to one embodiment of the invention.

FIG. 9 shows a Message Sequence Chart relating to at least a portion of a method according to one embodiment of the invention. FIG. 9 is related to an arrangement and method involving N number of antenna units 104, 106 and depicts the transmission of signals and transmission of data that may be carried out. Each antenna unit is associated with a radio unit 108, 110, while a radio unit could be associated with one or more antenna units. For instance, the first antenna unit 104 and second antenna unit 106 may be associated with or considered to be comprised in the same radio unit. In the embodiment of FIG. 9, the first antenna unit 104 transmits the first signal at time $T_1$. The first signal may be received by at least a portion of the other antenna units of the arrangement 100. FIG. 9 shows the first signal being received at the second antenna unit 106, third antenna unit 902, and Nth antenna unit 904.

The second antenna unit 106 may be configured to transmit a first response signal at time $T_2$, while this signal may be received by at least a portion or all of the other antenna units of the arrangement 100. The third antenna unit 902 may also be configured to the transmit a first response signal at time $T_3$, which may be received by at least a portion of the other antenna units of the arrangement. FIG. 9 shows antenna unit N transmitting a first response signal at time $T_N$, which is received by at least the first antenna unit 104, second antenna unit 106, and third antenna unit 902.

At time $T_{N+1}$, the first antenna unit 104 may be configured to transmit the second signal. The second signal may in other embodiments of the invention be transmitted by one of the other AUs in the arrangement. Second response signals are shown as being transmitted by each of the second antenna unit (at time $T_{N+2}$), third antenna unit (at time $T_{N+3}$), and Nth antenna unit (at time $T_{2N}$).

Each of the radio units 108, 110 (first radio unit 108, second radio unit 110, and/or any further radio units of an arrangement 100) may determine at least first phase information, first response phase information, second phase information, and/or second response phase information. FIG. 9 depicts the determined phase information as being transmitted to the processor 102 at time $T_{2N+1}$. The processor 102 may thereafter determine the at least first and second phase sums associated with each pair of antenna units and the at least one distance indicator.

The invention has been explained above with reference to the aforementioned embodiments, and several advantages of the invention have been demonstrated. It is clear that the invention is not only restricted to these embodiments, but comprises all possible embodiments within the spirit and scope of inventive thought and the following patent claims.

The features recited in dependent claims are mutually freely combinable unless otherwise explicitly stated.

The invention claimed is:

1. A method for evaluating a distance between at least a first antenna unit and a second antenna unit, the method comprising at least transmitting a first signal via the first antenna unit, said first signal comprising a first circular polarization, receiving the first signal at the second antenna unit, determining first phase information, said first phase information being indicative of a phase of the received first signal with respect to a local oscillator of a radio unit with which the second antenna unit is associated, transmitting a first response signal via the second antenna unit, said first response signal essentially corresponding to said first signal, receiving the first response signal at the first antenna unit, determining first response phase information, said first response phase information being indicative of a phase of the received first response signal with respect to a local oscillator of a radio unit with which the first antenna unit is associated, determining a first phase sum being indicative of a sum of the first phase information and the first response phase information, transmitting a second signal via one of the first or second antenna units, said second signal comprising a second circular polarization, the second circular polarization being opposite to the first circular polarization, receiving the second signal at the other of the first or second antenna unit, determining second phase information, said second phase information being indicative of a phase of the received second signal with respect to a local oscillator of the radio unit with which the receiving antenna unit is associated, transmitting a second response signal via the other of the first or second antenna units which has not transmitted the second signal, said second response signal essentially corresponding to said second signal, receiving the second response signal at the antenna unit that has transmitted the second signal, determining second response phase information, said second response phase information being indicative of a phase of the received second response signal with respect to the local oscillator of a radio unit with which the receiving antenna unit is associated, determining a second phase sum being indicative of a sum of the second phase information and the second response phase information, and determining at least one distance indicator that is indicative of the distance between the first antenna unit and the second antenna unit based on at least the first phase sum and second phase sum.

2. The method of claim 1, wherein the at least one distance indicator comprises a first distance variable indicative of a sum of the first phase sum and second phase sum.

3. The method of claim 1, comprising obtaining direction of signal data with respect to the coordinate system of each of the first and second antenna unit and utilizing said direction of signal data in the determination of the at least one distance indicator, optionally by obtaining antenna phase pattern calibration data and interpolating an antenna phase response.

4. The method of claim 3, wherein the method comprises receiving the transmitted signals at at least three separate antenna elements comprised in the first antenna unit and/or second antenna unit to determine said direction of signal data.

5. The method of claim 1, wherein the phase information, phase sums and/or distance indicator is determined with respect to a reference point of the first antenna unit and/or second antenna unit, said reference point optionally being a geometric center on the antenna unit plane with respect to positions of two or more antenna elements comprised in each antenna unit.

6. The method of claim 1, wherein the method comprises determining self-measurement data indicative of a phase of a self-measurement signal, for the first and second polarizations, received at a transmitting antenna unit during transmission of a signal and utilizing said self-measurement data in determining the at least one distance indicator.

7. The method of claim 1, wherein the at least one distance indicator comprises a rotation variable indicative of a difference between the first phase sum and the second phase sum, and the method optionally comprises determining a rotation angle between the first antenna unit and the second antenna unit based on the rotation variable.

8. The method of claim 7, wherein the rotation variable is determined at least once and utilized in tracking of the rotation angle between the first antenna unit and the second antenna unit, the method comprising transmitting subsequent first signals and first response signals to determine subsequent first phase sums, where the rotation variable is used to compensate for the rotation angle between the first antenna unit and the second antenna unit, to track the distance between the first antenna unit and second antenna unit.

9. The method of claim 1, wherein each of the at least first and second antenna units transmits at least one signal within a predetermined time slot and in predetermined order.

10. The method of claim 9, wherein the first antenna unit is a master unit and the remaining at least second antenna unit is a slave unit, the master unit being configured to transmit the first signal, wherein the master unit is configured to check before transmission of the first signal at each measurement cycle whether a radio channel is free for transmission and if the channel is free, the at least first signal is transmitted, said transmitting not being executed if the channel is not free.

11. The method of claim 9, wherein the slave unit(s) are configured to determine, before transmitting of a signal in a given measurement cycle, if a previous antenna unit in the predetermined order of antenna units has transmitted a signal in the measurement cycle, and if yes, transmit their respective signal, while the signal is not transmitted if it is determined that the previous antenna unit has not transmitted a signal.

12. The method of claim 1, wherein the method comprises evaluating at least two distances between a plurality of antenna units by additionally at least
   receiving the first signal at at least a third antenna unit,
   transmitting a first response signal via the third antenna unit and receiving the first response signal at at least the first antenna unit,
   receiving the second signal at at least the third antenna unit, and
   transmitting a second response signal via the third antenna unit and receiving the second response signal at at least the first antenna unit
   to obtain at least two pairs of antenna units that have performed two-way transmission of at least a signal comprising the first polarization and a signal comprising the second polarization and
   determining respective phase information for each pair of antenna units,
   determining respective first and second phase sums for each pair of antenna units, and determining at least one distance indicator being indicative of the distance between the antenna units, for each pair of antenna units.

13. An arrangement for evaluating a distance between at least a first antenna unit and a second antenna unit, the arrangement comprising at least a first antenna unit associated with a first radio unit, a second antenna unit associated with a second radio unit, and a processor, wherein the arrangement is configured to
   transmit a first signal via the first antenna unit, said first signal comprising a first circular polarization,
   receive the first signal at the second antenna unit,
   determine first phase information, said first phase information being indicative of a phase of the received first signal with respect to a local oscillator of a radio unit with which the second antenna unit is associated,
   transmit a first response signal via the second antenna unit, said first response signal essentially corresponding to said first signal,
   receive the first response signal at the first antenna unit,
   determine first response phase information, said first response phase information being indicative of a phase of the received first response signal with respect to a local oscillator of a radio unit with which the first antenna unit is associated,
   determine a first phase sum being indicative of a sum of the first phase information and the first response phase information,
   transmit a second signal via one of the first antenna unit or second antenna unit, said second signal comprising a second circular polarization, the second circular polarization being opposite to the first circular polarization
   receive the second signal at the other of the first or second antenna unit,
   determine second phase information, said second phase information being indicative of a phase of the received second signal with respect to a local oscillator of the radio unit with which the receiving antenna unit is associated,
   transmit a second response signal via the other of the first or second antenna units, which has not transmitted the second signal, said second response signal essentially corresponding to said second signal,
   receive the second response signal at the antenna unit that has transmitted the second signal,
   determine second response phase information, said second response phase information being indicative of a phase of the received second response signal with respect to the local oscillator of a radio unit with which the receiving antenna unit is associated,
   determine a second phase sum being indicative of a sum of the second phase information and the second response phase information, and
   determine at least one distance indicator that is indicative of the distance between the first antenna unit and the second antenna unit based on at least the first phase sum and second phase sum.

* * * * *